US008218587B2

(12) United States Patent  
Stoev et al.

(10) Patent No.: US 8,218,587 B2  
(45) Date of Patent: Jul. 10, 2012

(54) AUTOMATED BANDWIDTH / WAVELENGTH ADJUSTMENT SYSTEMS AND METHODS FOR SHORT PULSE LASERS AND OPTICAL AMPLIFIERS

(75) Inventors: Ventzislav Stoev, Fremont, CA (US); Kevin Holsinger, Menlo Park, CA (US); David S. Bell, San Jose, CA (US); Olaf Korth, Fremont, CA (US)

(73) Assignee: Newport Corporation, Irvine, CA (US)

( * ) Notice: Subject to any disclaimer, the term of this patent is extended or adjusted under 35 U.S.C. 154(b) by 223 days.

(21) Appl. No.: 12/790,653

(22) Filed: May 28, 2010

(65) Prior Publication Data

US 2011/0292954 A1    Dec. 1, 2011

(51) Int. Cl.
*H01S 3/10* (2006.01)

(52) U.S. Cl. .............. 372/20; 372/18; 372/23; 372/25; 372/32; 372/94; 372/99; 372/100; 372/103

(58) Field of Classification Search ............ 372/20, 372/18, 23, 25, 32, 94, 99, 100, 103
See application file for complete search history.

(56) References Cited

U.S. PATENT DOCUMENTS

| | | | |
|---|---|---|---|
| 3,594,663 A | 7/1971 | Allen | |
| 4,462,103 A | 7/1984 | Salour et al. | |
| 5,079,772 A | 1/1992 | Negus et al. | |
| 5,097,471 A | 3/1992 | Negus et al. | |
| 5,185,750 A | 2/1993 | Kafka et al. | |
| 5,212,698 A | 5/1993 | Kafka et al. | |
| 5,235,605 A | 8/1993 | Rines et al. | |
| 5,276,695 A * | 1/1994 | Scheps | 372/20 |
| 6,055,261 A | 4/2000 | Reed et al. | |
| 6,594,301 B2 * | 7/2003 | Pang | 372/100 |
| 6,853,655 B2 | 2/2005 | Holsinger | |
| 6,930,822 B2 | 8/2005 | Boggy et al. | |
| 7,555,023 B2 | 6/2009 | Ell et al. | |
| 2002/0136245 A1 * | 9/2002 | Pang | 372/20 |
| 2009/0034077 A1 | 2/2009 | Kane | |

FOREIGN PATENT DOCUMENTS

| | | |
|---|---|---|
| WO | WO 93/22810 | 11/1993 |
| WO | WO 2006/133387 | 12/2006 |
| WO | WO 2011/022547 | 2/2011 |

OTHER PUBLICATIONS

Asaki et al., "Generation of 11-fs pulses from a self-mode-locked Ti:sapphire laser," Opt. Letters, vol. 18 (1993) pp. 977-979.
Christov et al., "Fourth-order dispersion-limited solitary pulses," Opt. Letters, vol. 19 (1994) pp. 1465-1467.
Christov et al., "Sub-10-fs operation of Kerr-lens mode-locked lasers," Opt. Letters, vol. 21 (1996) pp. 1493-1495.

(Continued)

*Primary Examiner* — Kinam Park

(74) *Attorney, Agent, or Firm* — Grant Anderson LLP

(57) ABSTRACT

Embodiments are directed to systems and methods for adjusting a wavelength, bandwidth or both. Such systems and methods may be applicable to laser beams within a laser cavity or amplifier. For some embodiments, such systems and methods may be used to allow a user to set a desired wavelength and bandwidth of a short pulse laser system for operation at those parameters without further adjustment by the user.

45 Claims, 8 Drawing Sheets

OTHER PUBLICATIONS

Ell et al., "Generation of 5-fs pulses and octave-spanning spectra directly from a Ti:sapphire laser," Opt. Letters, vol. 26, (2001) pp. 373-375.

Golubovic et al., "Double Gires-Tournois interferometer negative-dispersion mirrors for use in tunable mode-locked lasers," Opt. Letters, vol. 25, (2000) pp. 275-277.

International Search report and Written Opinion mailed on: Apr. 29, 2011 in International Application No. PCT/US2010/046019 filed on Aug. 19, 2010 and published as: WO 2011/022547 on Feb. 24, 2011.

Lai et al., "Construction of a Wavelength-Tunable Self-Starting Kerr Lens Mode-Locked Ti: Sapphire Laser System," Chinese Journal of Physics, vol. 34 (1996) pp. 111-121.

Lemoff and Barty, "Cubic-phase-free dispersion compensation in solid-state ultrashort-pulse lasers," Opt. Letters, vol. 18 (1993) pp. 57-59.

Mayer et al., "Ultrabroadband chirped mirrors for femtosecond lasers," Opt. Letters, vol. 22 (1997) pp. 528-530.

Zhu et al., "Study of dispersion compensation in femtosecond lasers," J. of Modern Optics, vol. 43 (1996) pp. 1701-1721.

Herrmann et al., "Higher-order phase dispersion in femtosecond Kerr-lens mode-locked solid-state lasers: sideband generation and pulse splitting," Opt. Letters, vol. 22, No. 4 (1997) pp. 236-238.

* cited by examiner

AUTOMATED BANDWIDTH / WAVELENGTH ADJUSTMENT SYSTEMS AND METHODS FOR SHORT PULSE LASERS AND OPTICAL AMPLIFIERS

FIELD OF THE INVENTION

Some embodiments are directed to optical systems and methods for generating light output beams. Some embodiments are directed more specifically to optical systems and methods for generating stable light output with an automatic tunability or adjustment of one or more parameters. The optical systems and methods may be applied to laser systems, such as ultra-short pulse lasers, optical amplifiers or any other suitable device.

BACKGROUND

Laser systems may be useful for many different applications. More particularly, tunable laser systems capable of emitting one or more optical beams over a range of wavelengths are presently used in applications including, without limitation, seed for optical amplifiers, multi-photon microscopy, optical coherence tomography, and harmonic generation. For some such applications, lasers having ultra-short pulse widths which are tunable over a range of lasing wavelengths may be desirable. While such attributes may be desirable, the modalities utilized within a laser system to generate these features may create practical difficulties. For example, a tunable laser that is configured to operate over a range of lasing wavelengths may be difficult to stabilize over the full tuning range because the interaction of the laser light with the optics of the system may be wavelength dependent. This phenomenon may be exacerbated in a laser system that produces ultra-short pulses that are sensitive to the dispersive properties of the optical system.

Solid state ultra-short pulse oscillators are well known and Ti:Sapphire is a commonly used gain medium to achieve pulse widths in the femto second range with these lasers. Typical pulse widths of commercial fs-oscillators may range from less than about 10 fs to about 1 picosecond. Oscillators with a tunable center wavelength or fixed center wavelength, but in any case no independent bandwidth control, have been offered commercially since the early 1990s. Lasers of this kind may be optimized to provide a predetermined bandwidth, which may result in a fixed pulse width for the laser output.

Due to the complexity of physical interactions between light and the optical elements of such systems, control or adjustability of a center wavelength and bandwidth may involve a number of difficulties. Maintaining optimal parameters in a multi-dimensional parameter space includes substantial challenges when trying to keep such a laser operational throughout a tuning process. The complexity of the task has not allowed for a commercial offering of a laser system in which the oscillator bandwidth can be tuned under hands-off conditions while simultaneously controlling the center wavelength of the emitted radiation.

While development efforts have been previously undertaken, the lacking market need and the state-of-the-art of the technology weren't sufficient for commercialization of such laser system. However, emerging applications in bio-science and chemistry as well as life and health science over recent years have increased the need to have hands-off, wavelength and bandwidth tunable seed sources as flexible tools for scientific applications.

What have been needed are stable and reliable tunable laser systems that operate with an ultra-short pulse width and which are automatically tunable and stable over a broad range of operating wavelengths and bandwidths. What has also been needed are such tunable laser systems with output beams which are stable over the entire operating range of wavelengths and bandwidths without the need for external adjustment and which are capable of maintaining stable pulses over the entire tunable range.

SUMMARY

Some embodiments are directed to a tunable laser system. The tunable laser system may include a laser cavity defined by an end mirror disposed at a first end of the laser cavity and an output coupler disposed at a second end of the laser cavity. A gain medium may be disposed within the laser cavity. The gain medium may include a crystal, such as Ti:Sapphire and have an opposed pair of beam input surfaces that may be parallel to each other in some circumstances. A wavelength tuning system may be configured to tune the laser system to lase at a band centered at the predetermined wavelength set by the user. A bandwidth control system may be configured to maintain the bandwidth of the lasing energy of the system at the predetermined bandwidth set by the user. The laser system may also include a controller which is operatively coupled to the wavelength tuning system and bandwidth control system. The controller may be configured to adjust the wavelength tuning system and bandwidth control system to maintain the respective predetermined center operating wavelength and bandwidth. Some embodiments also include a user interface device configured to allow a user to select a predetermined center operating wavelength and bandwidth. Some embodiments also include a pump source configured to generate pump energy that passes through the gain medium along the laser beam path within the gain medium.

Some embodiments are directed to a tunable laser system. The tunable laser system may include a laser cavity defined by an end mirror disposed at a first end of the laser cavity and an output coupler disposed at a second end of the laser cavity. A gain medium may be disposed within the laser cavity. The gain medium, which may include a Ti:Sapphire crystal, may include an opposed pair of beam input surfaces which may be parallel to each other in some cases. A wavelength tuning system may be configured to tune the laser system to lase at a band centered at the predetermined wavelength set by the user. A bandwidth control system may be configured to maintain the bandwidth of the lasing energy of the laser system at the predetermined bandwidth set by the user. The laser system may also include a dispersion control system including at least one chirped reflective mirror. In some instances, the chirped reflective mirror may have a reflective surface that includes a parabolic response curve configured to control dispersion within the laser cavity of the laser system.

Some embodiments include a method of generating short-pulse laser output having a preselected center operating wavelength and preselected bandwidth. The method may include entering a desired preselected center operating wavelength and preselected bandwidth into a user interface of a laser system. The preselected center operating wavelength and bandwidth data previously entered into the user interface may then be processed with a processor. The processing may include correlating the preselected center operating wavelength and bandwidth data with corresponding settings for a wavelength tuning system and a bandwidth control system of the laser system. The respective settings may be communicated from the processor to the wavelength tuning system and bandwidth control system. The wavelength tuning system and bandwidth control system may then assume respective configurations corresponding to the respective settings. A gain medium disposed within a laser cavity of a laser system may be pumped with pump energy in order to generate a laser beam within the laser cavity having a center pre-selected operating center wavelength and a pre-selected bandwidth.

Certain embodiments are described further in the following description, examples, claims and drawings.

Figure 1:
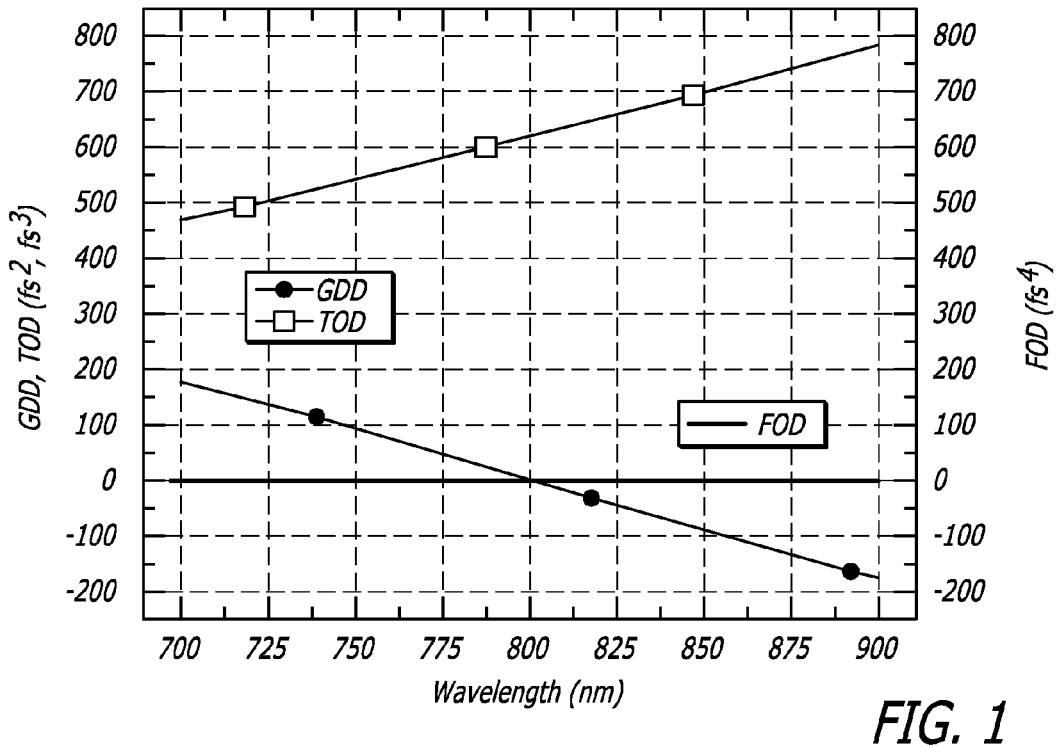
FIG. 1 illustrates dispersion of a linear chirped mirror embodiment including plots for group delay dispersion (GDD), third order dispersion (TOD) and fourth order dispersion (FOD), which happens to be zero and wavelength independent in this representation.

The drawings illustrate embodiments of the invention and are not limiting. For clarity and ease of illustration, the drawings are not made to scale and, in some instances, various aspects may be shown exaggerated or enlarged to facilitate an understanding of particular embodiments.

DETAILED DESCRIPTION

As discussed above, emerging applications in bio-science and chemistry as well as life and health science over recent years has increased the need for a hands-off, wavelength and bandwidth tunable laser systems and optical amplifier systems. However, due to the complexity of physical interactions between light and the optical elements of such systems, control or adjustability of a center wavelength and bandwidth may involve a number of control (open and closed) loops to achieve the desired output parameters. In particular, the tunability of the bandwidth may require maintaining optimal parameters in a multi-dimensional parameter space with substantial challenges when trying to keep the laser operational throughout the tuning process. In general, the complexity of this task has impeded a commercial offering of a laser system in which both the oscillator bandwidth and center wavelength of the emitted radiation can be simultaneously tuned or controlled under hands-off or automated conditions. Discussed herein are systems and methods directed not just to operating a broadband oscillator fully automatically, but also to tuning wavelength and bandwidth fully automatically. One or more solutions have been developed that provide reliable performance even over a large range of bandwidth tunability.

Laser system embodiments discussed herein may include a fully automated and computer/software controlled configuration to control all necessary physical parameters to allow a user of the laser system independent emission wavelength and emission spectral bandwidth control. Along with a user's ability to control wavelength and spectral bandwidth, the control of the pulse width and the pulse peak power of the emitted radiation may also be controlled with system embodiments discussed herein. Some laser system embodiments may include the simultaneous control of the wavelength through the spatial position of an aperture within the resonator cavity, the spectral bandwidth through the spatial restriction of the resonator cavity mode in a suitable position and the dispersion of the resonator cavity with a combination of prisms and dispersive mirrors. An effect of the spatial position of an appropriately placed aperture in the resonator cavity may be used for the wavelength selection. However, since the dispersion and resonator losses may be a function of the wavelength, their simultaneous control may be required to achieve any desired spectral bandwidth.

Embodiments of the laser system may include specially designed optical mirrors, with tailored properties regarding reflectivity and dispersion to allow broadband operation within a certain wavelength range, and one or more software algorithms for control and optimization of dispersion, bandwidth or both at any given wavelength in a wavelength tuning range of the laser system. This may allow for completely hands-off operation of a laser system within a parameter space that has not been previously available.

Embodiments of a laser system may include a Titanium-Sapphire crystal as the gain medium. However, the adjustment and control embodiments discussed herein may be equally applicable to any other suitable laser gain medium which provides sufficient bandwidth to support ultra-short pulses (<1 ps) in a mode-locked oscillator. In some circumstances, the wavelength range that may be achieved by a laser system may not be fundamentally limited by these control embodiments, but by the gain medium used to generate the laser emission. While embodiments have been applied and demonstrated at the highest gain region of Titanium-Sapphire, they may be applied equally to any wavelength range covered by any appropriate laser gain medium.

Software algorithm embodiments may be used to implement the wavelength and bandwidth tunability by means of mechanical movement and positioning of apertures and prisms within the resonator cavity. The apertures may provide the means to control wavelength and spectral bandwidth, whereas the prisms may be used as the means to control the dispersion in the resonator cavity. In addition, simultaneous control of a mode-locked oscillator pump power source of the laser system may be another useful factor for controlling both output parameters of wavelength and bandwidth at the same time. Some embodiments may include the instantaneous combination of all these controls with a distinct software algorithm and the implementation of calibration or lookup tables accessible by a controller or processor for adjustment of the dispersion and the wavelength of the laser system embodiment.

Some embodiments may also include beam diagnostics and algorithms for self-optimization. A specific algorithm, which may be implanted in software and hardware, may enable the exhaustive search of multi-dimensional optical parameter spaces for full automation of adjustment of the wavelength and bandwidth of the laser system. Furthermore, other intelligent feedback algorithms may be used to control optical elements such as the pump diodes, beam pointing, apertures and prisms for some embodiments. Fully automated, hands-off control of wavelength and spectral bandwidth in an ultra-fast (<1 ps) oscillator may provide a level of flexibility in choosing the system parameters that have not been previously provided in laser systems. Such a laser or optical amplifier system may allow for new types of experiments where pulse width dependent phenomena can be studied, since different pulse width become accessible in a practical, automated way from one system. For some other types of systems, working with a different pulse width would require complicated manual adjustment and reconfiguration of the system or multiple systems for multiple pulse width generation. Some of the embodiments discussed herein may allow for new types of experiments where the peak power can become the variable to study non-linear effects with strong peak power dependence.

Examples of some experiments may include imaging applications in biology, molecular dynamics studies in chemistry and for instance peak power/pulse width dependent micro-machining processes. In addition non-linear optical effects and their peak power/pulse width dependence in physics may also be carried out.

Laser system embodiments discussed herein may be used as a seed laser for ultra-fast amplifiers. In some such circumstances, this may enable high energy femtosecond systems with variable temporal pulse width, wavelength, spectral bandwidth and peak power. The usefulness of such systems may be leveraged into many types of amplified ultra-fast high-energy systems independent of particular repetition rates or pulse energies.

For sub-20 fs optical pulses generated directly from Ti:sapphire laser devices and the like, one of the limitations on pulse duration in some circumstances is the third-order of optical dispersion of the system. Third order dispersion may be reduced in several ways. In some circumstances, choosing optical materials with low third order dispersion, compared to group-velocity dispersion, reducing the total amount of optical material in the laser pathway or optical train of the laser cavity, and thus the third order dispersion, or using chirped mirrors may be used. In some circumstances, the limitation of the next dispersion term may include fourth-order dispersion on a pulse-breaking and multi-peak spectrum. In the case of a Ti:sapphire gain medium laser system, there may be only a few prism materials which lead to compensation of an overall group-delay dispersion together with third order dispersion close to the maximum gain of the amplification curve. Also, in some circumstance there may be no material combination which can effectively minimize all three dispersion orders—group-delay dispersion, third order dispersion and fourth-order dispersion at the same wavelength.

A solution to minimize dispersion of all three orders together may include the use a chirped mirror-only solution, or to use a mixed prism pairs-chirped mirror solution. If the laser is tunable, a chirped mirror-only solution may not be practical in some circumstances, as it may not be possible to change the central wavelength in these cases. Mixed prism pair-chirped mirror dispersion control inside the cavity may also control a central wavelength by the meaning of spectral-dependant losses in the spatially resolved spectrum.

Using a shorter gain medium crystal may be used to minimize third order dispersion and fourth-order dispersion for the same amount of negative group-delay dispersion. Also, the length of the gain medium crystal may be an important limitation for the pulse duration even with good compensation of the net group-delay dispersion and lack of higher orders of dispersion. The reason for this includes the space-time focusing of a pulse inside the crystal imposing spectral filtering at the extreme short pulse duration of sub-10 fs.

Besides the linear effects such as the time-delay dispersion, passive mode-locking solid-state lasers may also have self-amplitude modulation, which is a pulse shortening force and tends to lock the phase of longitudinal modes of the laser system. In some embodiments discussed herein, self-amplitude modulation may be due to Kerr-nonlinearity based self-focusing in the crystal interplay with the gain aperture and gain-guiding effect. The strength of the self-amplitude modulation may be important for the stability of CW mode-locking as well as for the self-starting conditions from a continuum.

In some circumstances, a longer gain medium crystal may result in a higher achievable self-amplitude modulation to ensure the stability of the mode-locking. A more complex way to increase the self-amplitude modulation includes the use of a second intra-cavity focus in a glass plate with high optical non-linearity.

In the case of dynamical range adjustment for the pulse duration of a laser system being from about sub-20 fs to about 100 fs, a relatively short crystal may be ruled out in some instances. For example, if using a Ti:sapphire lasers gain medium crystal, a 1 mm to 2 mm long highly doped crystal may not be practical to use. Such a short beam path length of 1-2 mm through the gain medium crystal may be good for achieving a very short pulse, but would not generate sufficient self-amplitude modulation for a longer pulse duration. Using a relatively long beam path through the gain medium crystal and heavier prism glass for prism-pairs dispersion compensation may also introduce a challenge for fine dispersion compensation for the terms equal and higher than fourth-order dispersion. These limitations may come from the chirped mirror technology. More specifically, both high dispersion together with large bandwidth may not be achievable in such circumstances. Typically, compromises may be needed between the absolute value of the group-delay dispersion and the operational bandwidth of a short-pulse laser system.

Group-delay dispersion ($\beta_2$) is the first derivative of the group-delay $T_G$ in respect of angular frequency $\omega$:

$$\beta_2(\omega_0) = \frac{d}{d\omega} T_G(\omega)\bigg|_{\omega_0} = \frac{d^2\varphi}{d\omega^2}\bigg|_{\omega_0} \qquad (1)$$

Next orders of dispersion, i.e. third order dispersion and fourth-order dispersion (denoted as $\beta_3$, and $\beta_4$)... and so on are just next derivatives of the group-delay dispersion with respect to angular frequency $\omega$.

In some circumstances, it may be more practical to express group-delay dispersion and higher dispersion terms as the derivatives of central wavelength, as the usual way to determine the material dispersion of materials may be the relation between the refractive index n and the wavelength $\lambda$—typically presented in terms of the Sellmeier equation where L represents the length of optically homogenous media, i.e.:

$$\beta_2(\lambda_0) = \frac{d^2\varphi}{d\omega^2}\bigg|_{\omega_0} = \frac{\lambda^3}{2\pi c^2}\frac{d^2n(\lambda)}{d\lambda^2}\bigg|_{\lambda_0} L \qquad (2)$$

$$\beta_3(\lambda_0) = \frac{d^3\varphi}{d\omega^3}\bigg|_{\omega_0} = -\frac{\lambda^2}{2\pi c}\frac{d}{d\lambda}\beta_2(\lambda)\bigg|_{\lambda_0} \qquad (3)$$

$$\beta_4(\lambda_0) = \frac{d^4\varphi}{d\omega^4}\bigg|_{\omega_0} = -\frac{\lambda^2}{2\pi c}\frac{d}{d\lambda}\beta_3(\lambda)\bigg|_{\lambda_0} = \left(\frac{\lambda^2}{2\pi c}\right)^2\frac{d^2}{d\lambda^2}\beta_2(\lambda)\bigg|_{\lambda_0} \qquad (4)$$

The signs of the terms of the dispersion for common optical refractive materials such as glasses at 800 nm are: positive for $\beta_2$, positive for $\beta_3$, and negative for $\beta_4$. Compensating for intra-cavity group-delay dispersion with Brewster-angled prism pairs may introduce a negative $\beta_2$, a negative $\beta_3$, and a negative $\beta_4$. Unfortunately the ratio between different orders of dispersion may be different for material as opposed to prism pair dispersion. For most laser gain materials that lase at about 800 nm, a ratio between third order dispersion and group-delay dispersion $\beta_3/\beta_2$ may be about 0.66 fs. A ratio between fourth-order dispersion and group-delay dispersion for material dispersion at a wavelength of about 800 nm may hold $|\beta_4/\beta_2|\ll 1$ fs$^2$. For a Brewster-angled prism pair, negative dispersion introduced at an operating wavelength of about 800 nm may be quite different, i.e.: $\beta_3/\beta_2 \sim 2$ fs; $\beta_4/\beta_2 \sim 3$fs$^2$ at the same 800 nm operating wavelength. In this respect, minimizing the net group-delay dispersion (small net negative group-delay dispersion helps for a soliton pulse to hold in the case of positive cubic non-linearity) with the help of intra-cavity prism pairs may also introduce excessive negative third order dispersion and negative fourth-order dispersion orders of dispersion, which may limit the bandwidth of the generated pulse.

If a constant negative group-delay dispersion design is chosen for a chirped cavity reflective mirror, the introduced third order dispersion and fourth-order dispersion may be zero. For some current technology embodiments using a double Gires-Tournois interferometer, negative group-delay dispersion of no more than negative −50 fs$^2$ per bounce flat group-delay dispersion may be produced for the chirped mirror.

In some circumstances, in order to compensate for a relatively long gain medium rod length of about 20 mm and a heavy-glass prism material, there may be no practical way to implement such mirrors without having significant uncompensated third order dispersion and fourth-order dispersion. In some embodiments, with 7 bounces or reflections taking place within a laser cavity, each reflection from a −50 fs$^2$ constant group-delay dispersion mirror, and prism compensation for the rest of the group-delay dispersion, the third order dispersion may be about −3300 fs$^3$, and the fourth-order dispersion may be about −8000 fs$^4$. In view of the time-delay due to the third order dispersion and fourth-order dispersion, a bandwidth of no more than about 17 nm may be feasible with such compensation. If the number of beam reflections or bounces increases, better compensation for third order dispersion and fourth-order dispersion may be achieved. However, in such circumstances, the prism pair distance or distance of separation between each prism of a given prism pair may be sufficiently small such that no practical wavelength tuning can be achieved due to spectral losses in the spatially dispersed spectrum.

Figure 2:
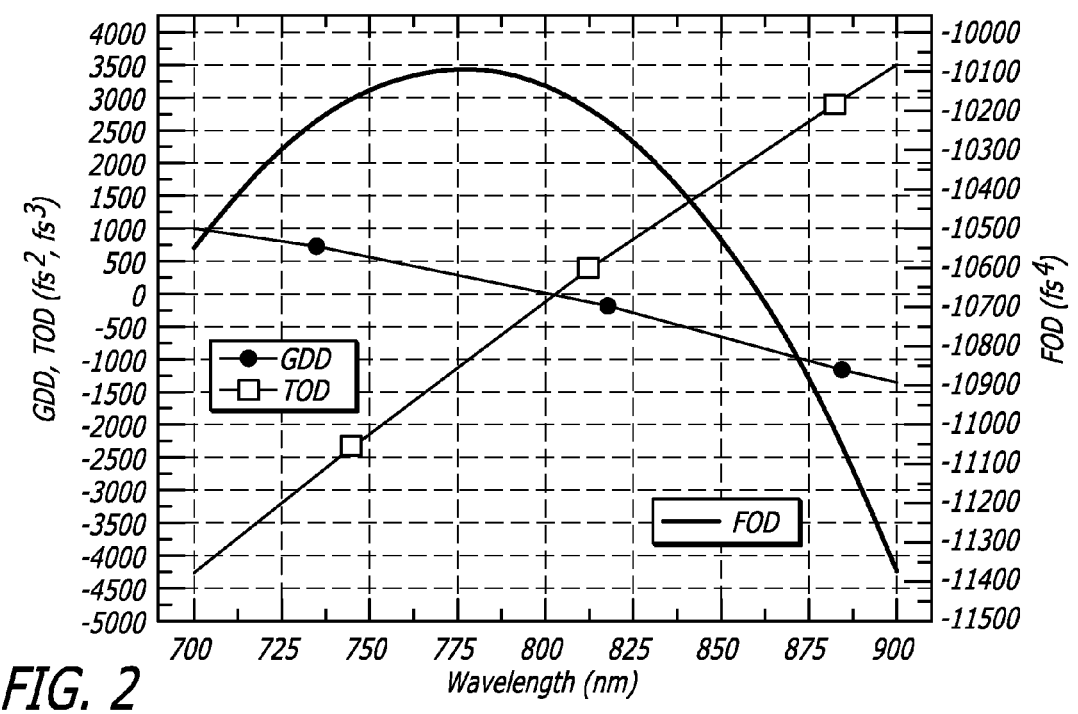
FIG. 2 illustrates intra-cavity net dispersion of a laser embodiment with mixed prism-pairs and 7 bounces of linear design chirped mirror dispersion compensation.

Some embodiments for compensating for the higher orders of dispersion may include the introduction of the chirped mirror design with group-delay dispersion with a linear slope with respect to wavelength. In some embodiments, a negative sloped linear group-delay dispersion may be used. Due to the relationship between the orders of dispersion represented by equations (3) and (4) above, the chirped mirror third order dispersion is positive, and fourth-order dispersion is zero, as shown in FIG. 1. In some embodiments, with only seven bounces or reflections of the linear group-delay dispersion mirror, negligible group-delay dispersion and third order dispersion may be achieved and negative fourth-order dispersion ~−10,000 fs$^4$ may be achieved, as shown in FIG. 2.

To estimate a generated bandwidth, the following expression for time-delay in respect with dispersion terms may be used:

$$T_G(\omega) = T_G(\omega_0) + \beta_2(\omega_0)(\omega - \omega_0) + \frac{1}{2}\beta_3(\omega_0)(\omega - \omega_0)^2 + \frac{1}{6}\beta_4(\omega_0)(\omega - \omega_0)^3 + \ldots \qquad (5)$$

Figure 3:
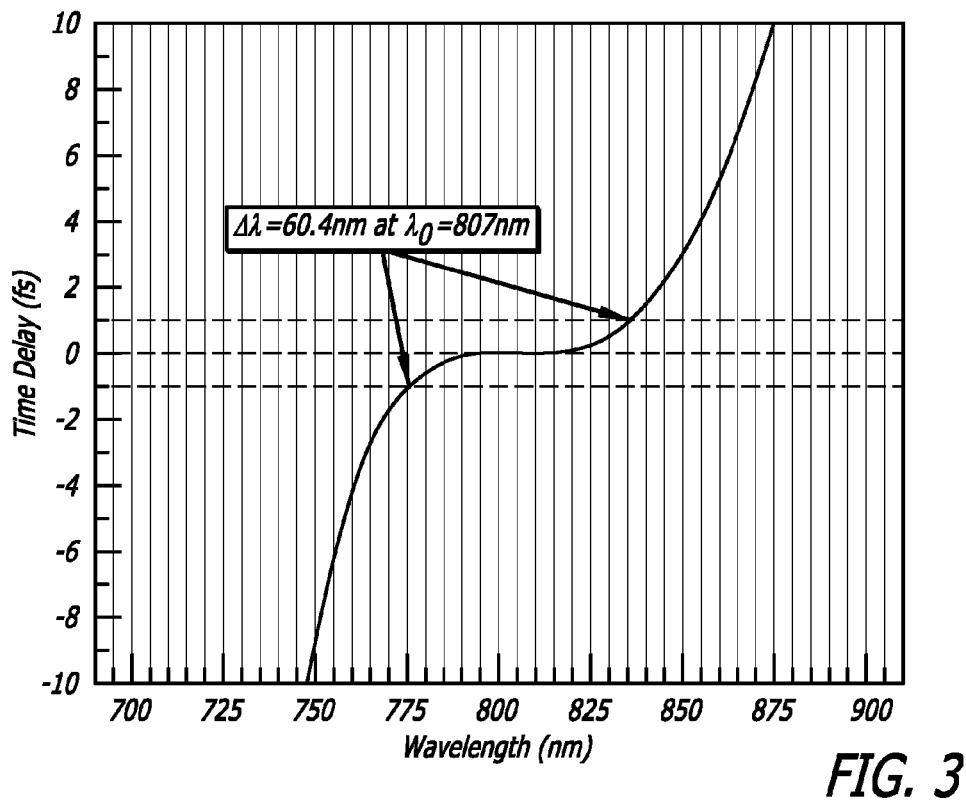
FIG. 3 illustrates the calculated time delay for the intra-cavity net dispersion of the data shown in FIG. 2.

Calculated bandwidth may be just the time delay at a 1 fs level of the spectral components as illustrated in FIG. 3.

A linear group-delay dispersion chirped mirror solution may be useful for relatively short beam paths through gain medium crystals, i.e., short gain medium crystals, and may be improved even in the case of relatively high-dispersion compensation compared to a design with a constant negative group-delay dispersion. Having a chirped mirror design with zero group-delay dispersion at an operating or lasing wavelength of about 750 nm to about 850 nm, more specifically, about 790 nm to about 810 nm, and even more specifically, about 800 nm, may allow the distance between each prism element of a Brewster-angled prism pair to be maintained relative to laser system embodiments wherein no chirped mirrors are used in the laser cavity. In that respect, better control of tunability of laser system embodiments may be achieved. Even with dispersion compensation of group-delay dispersion and third order dispersion, excessive fourth-order dispersion may still express itself as a dip in the spectrum at relatively modest bandwidths of about 70 nm full width at half maximum (FWHM) of intensity. In some examples, a designed chirped mirror may have a group-delay dispersion of about −50 fs$^2$ and positive third order dispersion of about 75 fs$^3$ at 800 nm wavelength.

In some embodiments, group-delay dispersion, third order dispersion, and fourth-order dispersion may be compensated for in a high-dispersion laser system embodiment by introducing the next quadratic polynomial order for group-delay dispersion design with respect to wavelength. Thus, every bounce or reflection from a chirped mirror may be used to produce appropriate group-delay dispersion, third order dispersion and fourth-order dispersion results.

Figure 4:
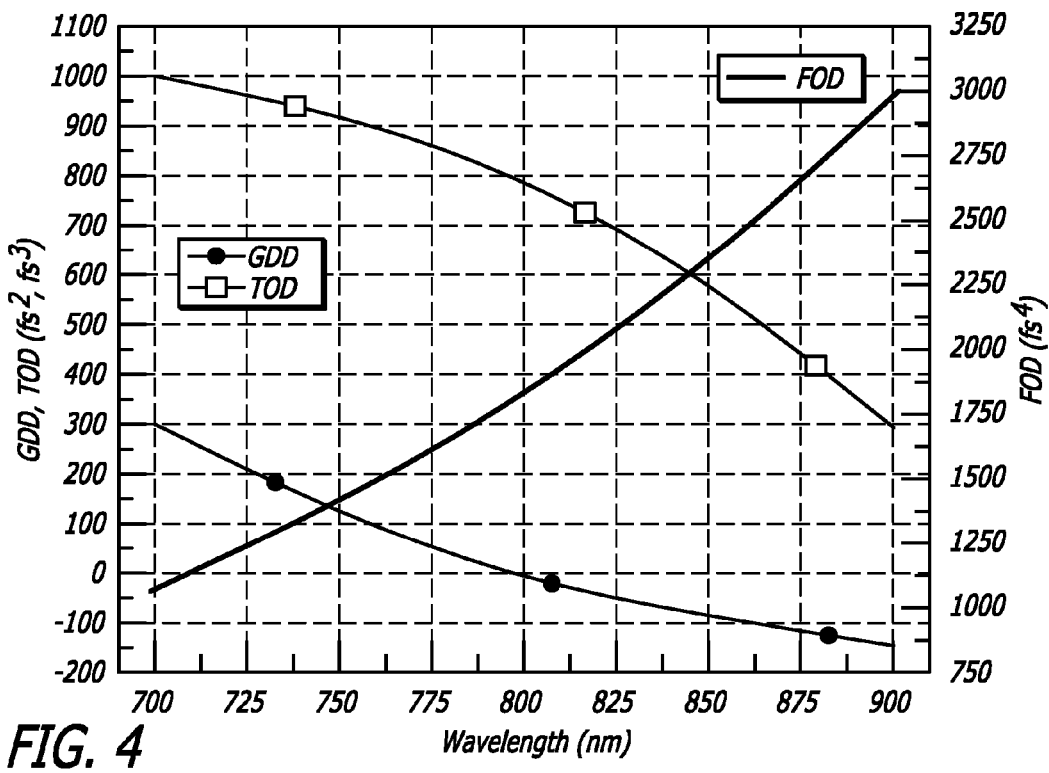
FIG. 4 illustrates dispersion data of a parabolic chirped mirror embodiment.
Figure 5:
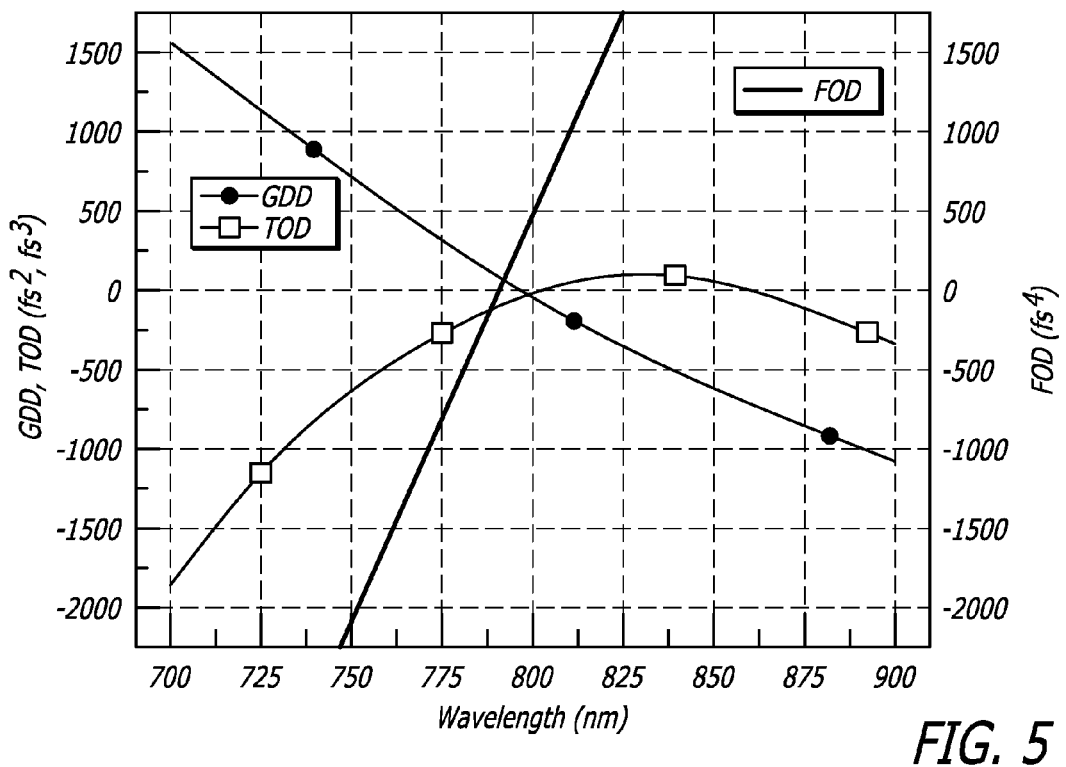
FIG. 5 illustrates intra-cavity net dispersion of a laser embodiment with mixed prism-pairs and 6 bounces of parabolic design chirped mirror dispersion compensation.
Figure 6:
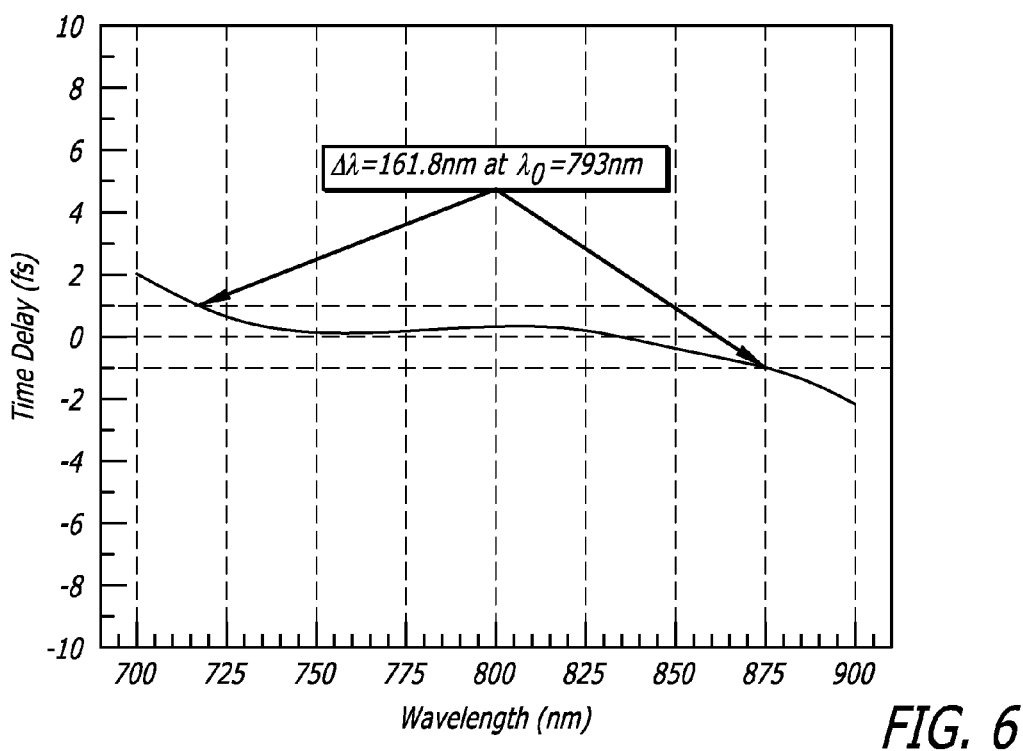
FIG. 6 illustrates the calculated time delay for the intra-cavity net dispersion data illustrated in FIG. 5.

For some embodiments, a parabolic group-delay dispersion design of a chirped mirror may be used which includes a curvature response configured to introduce a positive third order dispersion and positive fourth-order dispersion per bounce. The dispersion values of such a parabolic group-delay dispersion design with respect to wavelength are illustrated in FIG. 4. Again, for some embodiments, a zero group-delay dispersion of the design may be configured for operation at 800 nm, which may keep or allow the prism separation distance to remain the same as embodiments without one or more chirped mirrors in the cavity. Thus, the spatial spectral filtering and the tunability of the central wavelength may be maintained for such embodiments. For embodiments with six bounces of a parabolic designed chirped mirror, all three orders of the dispersion including group-delay dispersion, third order dispersion, and fourth-order dispersion at the same operating or lasing center wavelength may be compensated, as shown in FIG. 5. Referring to FIG. 6, the possible generated bandwidth of such a laser system may be over 160 nm for the same 1 fs time-delay for some embodiments.

Some experiments with a laser system such as that discussed above have demonstrated a smooth, single-peak spectrum for up to 90 nm full width half maximum (FHWM) with power of more than 400 mW. The explanation for the smaller generated bandwidth than some linear dispersion calculations may suggest may include the non-soliton nature of the pulse build-up with overall small negative group-delay dispersion, but high dispersion of the discrete elements inside the cavity. This may differ from the simple soliton model. Also as it was mentioned above, a relatively long beam path through a laser gain medium crystal may also generate spectral filtering at the extremes of short pulse generation. In these experiments, the pulses were easily compressible to sub-20 fs pulse widths with a simple external Brewster-angled prism pair compressor. If the higher orders of the dispersion are compensated for with an external compressor, close to 10 fs pulses may be expected. In addition, the compressor length or separation distance between prism elements of a prism pair for achieving the minimum pulse duration may be the same for different bandwidths.

A parabolic chirped mirror design may also allow the use of a relatively long Ti:sapphire crystal of 20 mm, and thus generate high dynamic range of short pulses with bandwidths between about 10 nm and about 100 nm. For bandwidths between about 10 nm and about 30 nm, a central wavelength may be tuned. An oscillator with such a pulse duration dynamic range may be used as a versatile seed laser for regenerative or multi-pass amplifiers with different pulse durations. Such embodiments may also be used for sub-25 fs amplifier, but also for much longer pulses—such as a 2 ps amplifier, where only 1 nm of seed bandwidth may be needed in some circumstances. The throughput of the pulse after spectral filtering down to 1 nm may be much higher if the pulse bandwidth is 10 nm, compared with 100 nm. In such cases, the amplified spontaneous emission of the amplifier may be much lower and amplified pulses have much better contrast.

Some tunable laser system embodiments may include a laser cavity defined by an end mirror disposed at a first end of the laser cavity and an output coupler disposed at a second end of the laser cavity. A gain medium may be disposed within the laser cavity. The gain medium may include a crystal, such as Ti:Sapphire and have an opposed pair of beam input surfaces that may be parallel to each other in some circumstances. A wavelength tuning system may be configured to tune the laser system to lase at a band centered at the predetermined wavelength set by the user. A bandwidth control system may be configured to maintain the bandwidth of the lasing energy of the system at the predetermined bandwidth set by the user. The laser system may also include a controller which is operatively coupled to the wavelength tuning system and bandwidth control system. The controller may be configured to adjust the wavelength tuning system and bandwidth control system to maintain the respective predetermined center operating wavelength and bandwidth. Some embodiments also include a user interface device configured to allow a user to select a predetermined center operating wavelength and bandwidth. Some embodiments also include a pump source configured to generate pump energy that passes through the gain medium along the laser beam path within the gain medium. Some laser system embodiments may also include a dispersion control system including at least one chirped reflective mirror. In some instances, the chirped reflective mirror may have a reflective surface that includes a parabolic response curve configured to control dispersion within the laser cavity of the laser system. In some embodiments, the dispersion control system may also include a device for adjusting the amount of dispersive material in the optical beam path. A translatable prism secured to a translation stage may be used for such a function.

Figure 7:
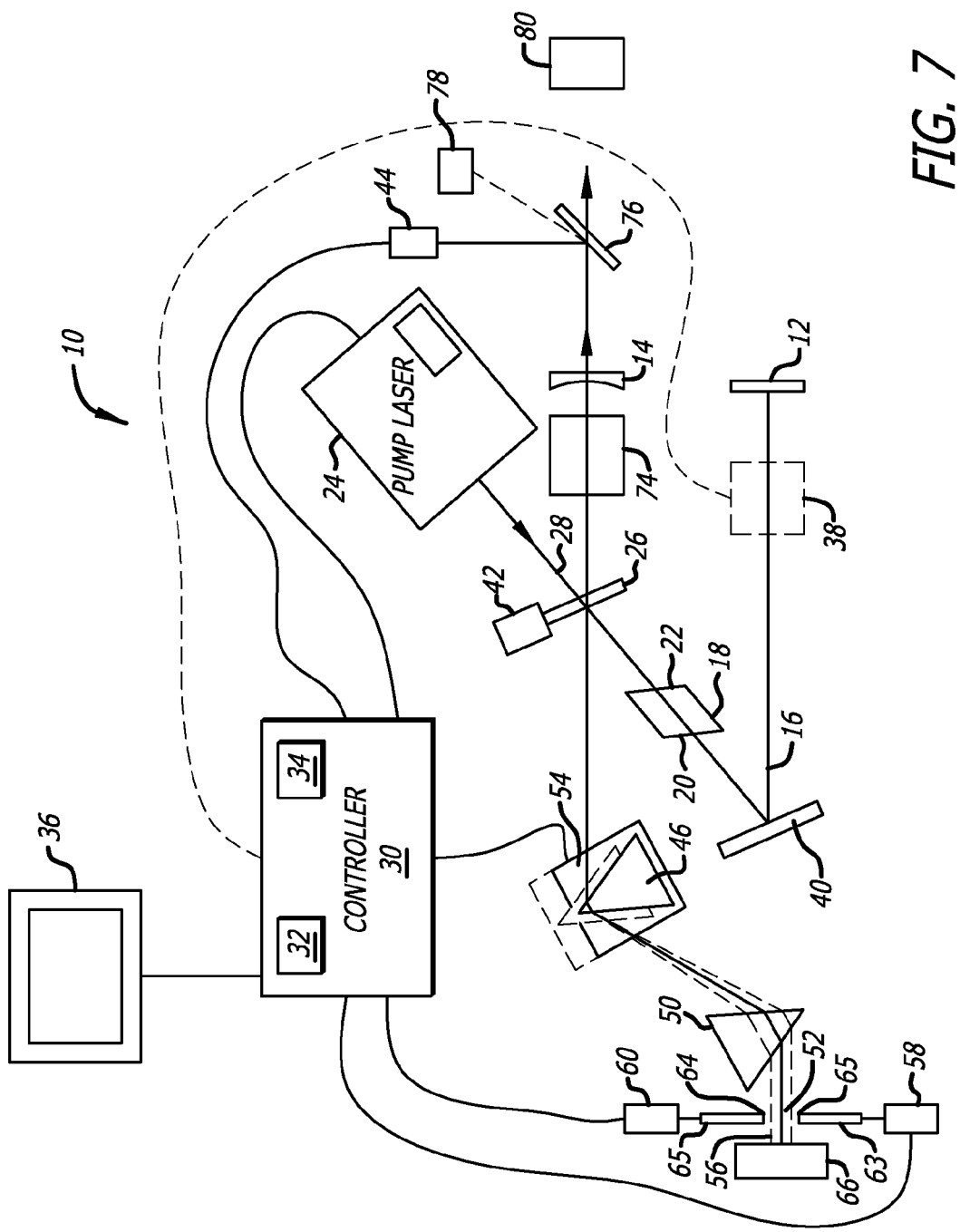
FIG. 7 is a schematic view of a laser system embodiment.

Referring to FIG. 7, a schematic diagram of such a tunable laser system 10 is shown. The laser system 10 includes a laser cavity or resonator formed between two reflective surfaces at opposite ends of the laser cavity. For the embodiment shown, the resonator or cavity is formed between a first cavity end mirror 12 and a second cavity end mirror or output coupler 14. For some embodiments, the first cavity end mirror 12 may be configured to completely reflect an incident beam 16 and the output coupler 14 may be configured to partially reflect an incident laser beam 16 while allowing a preselected percentage of an incident beam to pass through the output coupler 14. A gain material or medium 18 is disposed between the cavity end mirrors 12 and 14 with a first beam input surface 20 and second beam input surface 22 which may be disposed substantially parallel to each other and disposed in the beam path of the laser cavity. The first and second beam input surfaces 20 and 22 of the laser gain medium 18 may or may not be substantially perpendicular to the laser beam path 16 of the laser system 10. For some embodiments, the input surfaces 20 and 22 of the laser gain medium 18 may form an angle of about 20 degrees to about 40 degrees with respect to the laser beam path. The laser gain material 18 may include a Ti:Sapphire crystal or any other suitable gain medium such as Er-based, Yb-based or CrLiSaf-based gain materials. For some embodiments, the laser gain material or medium 18 may have an axial length for a beam path therethrough of about 1 mm to about 40 mm, more specifically, about 10 mm to about 20 mm.

A pump energy source in the form of a pump laser 24 is disposed adjacent the mirror 26 and configured to emit an output pump beam 28 through a back surface of mirror 26 and into the laser cavity. More specifically, the pump laser source 24 may be configured to emit a pump energy beam 28 through a back surface of the reflective mirror 26 and into the gain medium 18. For such embodiments, the reflective mirror 26 may be made of a material, include coatings or otherwise be configured to reflect a beam wavelength of the laser cavity but transmit a pump energy light beam 28 of the pump energy source 24. For some embodiments, the laser cavity and gain medium 18 of the laser system 10 may be configured to lase or be tuned by a wavelength tuning system to lase at a wavelength of about 780 nm to about 820 nm, and the pump energy source 24 may be configured to generate a pump energy beam 28 at a wavelength of about 450 nm to about 1000 nm. The pump energy source may also be configured to generate a pump energy beam at any pump wavelength appropriate for a particular gain medium. For some embodiments, the mirror 26 may have a selectively reflective coating including materials such as SiO, TiO or AlO. Although the embodiment shown in FIG. 7 indicates that the pump energy source 24 emits pump laser energy directly into the back surface of the mirror 26, the pump energy source 24 may be disposed in a more remote location away from the laser cavity. In such cases, the pump energy emitted from the pump energy source 24 may be directed to the laser gain material 18 by one or more mirrors (not shown) configured to direct the pump energy along a desired path to the laser gain material 18.

For some laser system embodiments 10, the pump energy source 24 may include any suitable type of laser such as a diode laser, diode pumped solid state laser, fiber laser, dye or gas laser. The pump laser source 24 may be configured to emit pump energy light having a wavelength of about 450 nm to about 1000 nm. In addition, the pump energy source may be in operative communication with a controller 30 and certain parameters of the pump laser 24, such as output power of pump source 24 including beam 28, diode power, gain medium temperature or wavelength conversion crystal temperature may also be controlled or adjusted by the communication of signals from the controller 30 to the pump energy source 24.

The controller 30 may include one or more computer processors 32, such as microprocessors, one or more memory devices 34 operatively coupled to the one or more processors 32 and various interface paths in order to communicate with the various other elements of the optical system 10. The controller 30 may be in operative communication with a user interface such as a graphic user interface (GUI) 36 which allows a user to input data such as desired or preselected laser beam parameters or parameter ranges. The controller 30 may then process such user input data and transmit control signals or data to various actuators or the like, which may include actuator motors such as stepper motors or piezoelectric actuators. Such actuators may be associated with optical elements of the laser system 10 in order to effect the preselected beam parameters selected by the user. In some instances, the processor 32 or a memory device 34 thereof, may include lookup data or tables (not shown) that include predetermined control signal data that correspond to beam parameter data entered by a user. Such lookup table data may be unique to a particular laser system 10 and programmed into the memory device 34 of the controller 30 prior to delivery to a user.

Once the pump energy source 24 is activated and emits pump energy light into the laser gain medium 18, the gain medium 18 will begin to emit light at the lasing wavelength of the gain medium 18 which may then be amplified due to the feedback between the cavity mirrors 12 and 14 of the laser cavity. A beam reflected from a reflective surface or surface coating of mirror 12 propagates through an optional acousto-optical modulator (AOM) 38 disposed adjacent end mirror 12. Mode-locking by AOM 38, such as regenerative mode-locking, may be used to enhance the performance of the laser system 10. After passing through the AOM 38, the laser beam 16 may be reflected from mirror 40 and back through a first beam input surface 20 of the laser gain medium 18. The beam will then be emitted from a second beam input surface 22 of the laser gain medium 18 and transmitted to mirror 26.

Mirror 26 may be adjustable with an actuator system, such as a piezoelectric controlled actuator system 42, as part of a control algorithm. The actuator system 42 of the mirror 26 may be operatively coupled to the controller 30 such that the controller 30 may transmit position correction signals to the actuator 42 and the actuator 42 will reposition the mirror 26 according the correction signal. An optional position detector 44 may also be operatively coupled to the controller 30 and used to detect the position of a path of an output beam of the laser system 10 in order to provide feedback to the controller 30 to provide pointing adjustments to the piezoelectric controlled actuator system 42 of mirror 26.

Figure 8:
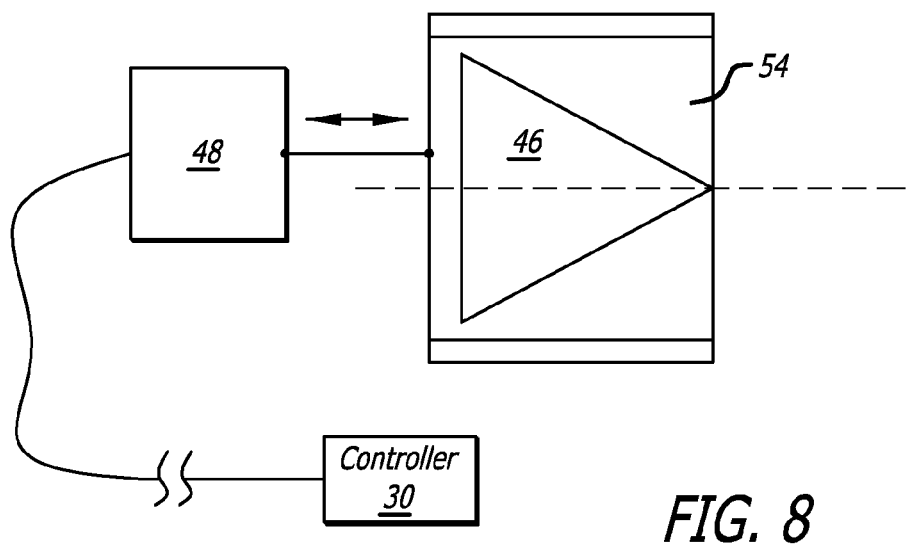
FIG. 8 is a schematic top view of components of a bandwidth control system embodiment.
Figure 9:
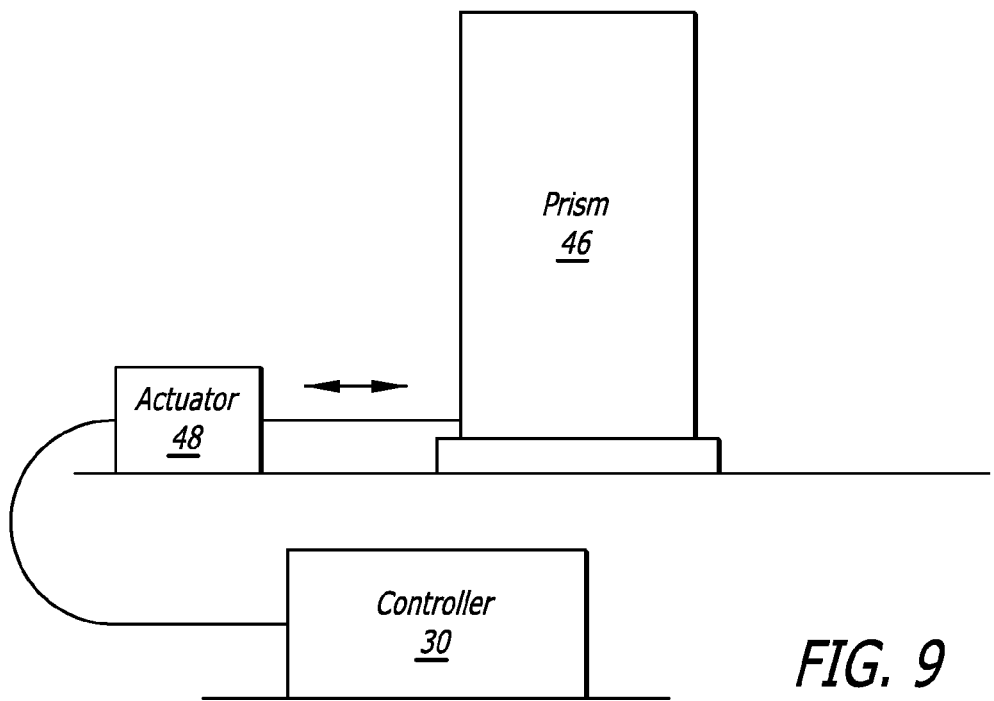
FIG. 9 is a schematic side view of components of a bandwidth control system embodiment.

After reflection from a reflective surface or coating of mirror 26, the laser beam propagates to a translatable prism 46. The prism 46 may be mechanically coupled to an actuator 48 which in turn may be in operative communication with the controller 30. For some control algorithm embodiments, prism 46 may be displaced according to signals from the controller 30 to an actuator of the prism 46 in order to insert varying amounts of solid material into the beam or optical path of the laser system 10. Prism 46 may also be paired with a prism 50 as shown which is positioned in the beam path between the prism 46 and an adjustable slit 52. The spatial displacement of prism 46 may be carried out by the actuator 48 translating a translatable prism stage 54 which prism 46 may be secured to. The translatable stage 54, actuator 48 and prism 46 are shown schematically in FIGS. 8 and 9. The translatable prism stage 54 includes the actuator in operative communication with a controller 30 as shown in FIGS. 8 and 9.

Figure 10:
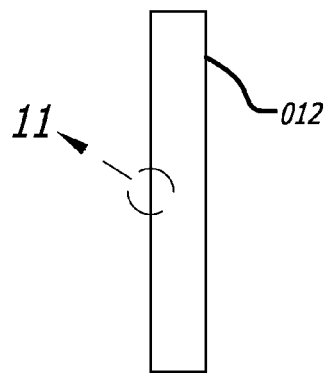
FIG. 10 is an elevation view of a cavity end mirror embodiment.
Figure 11:
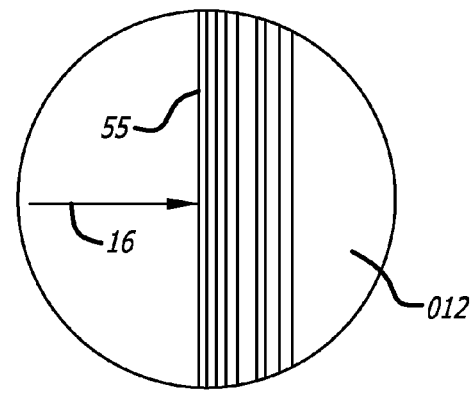
FIG. 11 is an enlarged view of a front reflective surface portion of the cavity end mirror of FIG. 10 illustrating a layered chirped coating embodiment of the mirror.

Such an arrangement of the translatable prism 46 may be used to adjust the amount solid dispersive material in the beam path 16 and may form all or part of a dispersion control system of the laser system 10. Control of the prism displacement and thus the amount of dispersive material such as glass in the beam path 16 of the laser beam in conjunction with a dispersion control coating such as chirped reflective surfaces of one or more mirrors in the laser cavity may be used to control group-velocity dispersion, third order dispersion and fourth order dispersion as discussed above. As such, any of the reflective surfaces of the optical elements in the laser cavity of the embodiment of FIG. 7 may include chirped reflective surfaces, including chirped surfaces having a parabolic response curve, as part of the dispersion control system of the laser system 10 in order to reduce or eliminate unwanted dispersion of the laser beam 16. In particular, reflective optics 12, 14, 26, 40 and 66 may include such chirped surfaces including parabolic response curve configurations. The chirped surfaces of the reflective optics may include multiple layers 55 of materials having different indices of refraction configured to reflect light of different wavelengths at different depths of the coating as shown in the view of reflective optic 12 shown in FIGS. 10 and 11. The layers 55, which may alternate between materials of differing indices of refraction, may be disposed on a substrate material having suitable mechanical strength, optical properties or both. Such substrate materials may include glass, fused silica or the like. For some embodiments, chirped layers 55 may have thicknesses of about 1 nm to about 400 nm, more specifically, about 2 nm to about 200 nm, and may be made of materials such as silicone oxide and titanium oxide. Such a laser system 10 may be configured to generate a laser beam having a pulse width of less than about 1 picosecond, more specifically, about 10 fs to about 100 fs.

For some embodiments, the prism pair 46 and 50 in conjunction with the adjustable slit 52 may be used as a wavelength tuning or control system, a bandwidth control system or both. For such a wavelength control system, the laser beam incident on prism 46 from mirror 26 is selectively refracted and spatially dispersed as a function of wavelength. The refracted and spatially dispersed beam then propagates to the prism 50 where the beam is recollimated, but remains spatially dispersed as a function of wavelength as shown by the dashed lines 56 in FIG. 7. The width and lateral spatial position of the slit 52 may then be set by signals from the controller 30 to set both the center wavelength and bandwidth of the laser beam 16 passing through the slit 52. Both of these adjustments or settings may be controlled by an algorithm which may be implemented in software instructions carried out by the controller 30. The position of slit 52 may be adjusted with a slit actuator or motor 58 and a width of slit 52 may be adjusted with a slit width motor or actuator 60. The slit actuator 58 and slit width actuator 60 may work together to determine both the separation of a first opaque edge 62 of a first shield member 63 of the slit 52 and a second opaque edge 64 of a second shield member 65 of the slit 52, as well as the lateral position of the center of the slit 52 relative to the laser beam 16 or any other suitable reference point. For some embodiments, the slit may be configured to be laterally translated by an amplitude of about 0 mm to about 30 mm. For some embodiment, the slit 52 may be configured to have a slit width of about 0 mm to about 5 mm. For some embodiments, the wavelength tuning system may be tunable over a wavelength range of about 450 nm. In addition, the wavelength tuning system may be configured to generate a center wavelength of the laser beam of about 650 nm to about 1100 nm. The bandwidth control system of these elements may be configured to generate a bandwidth of about 10 nm to about 120 nm.

Figure 12:
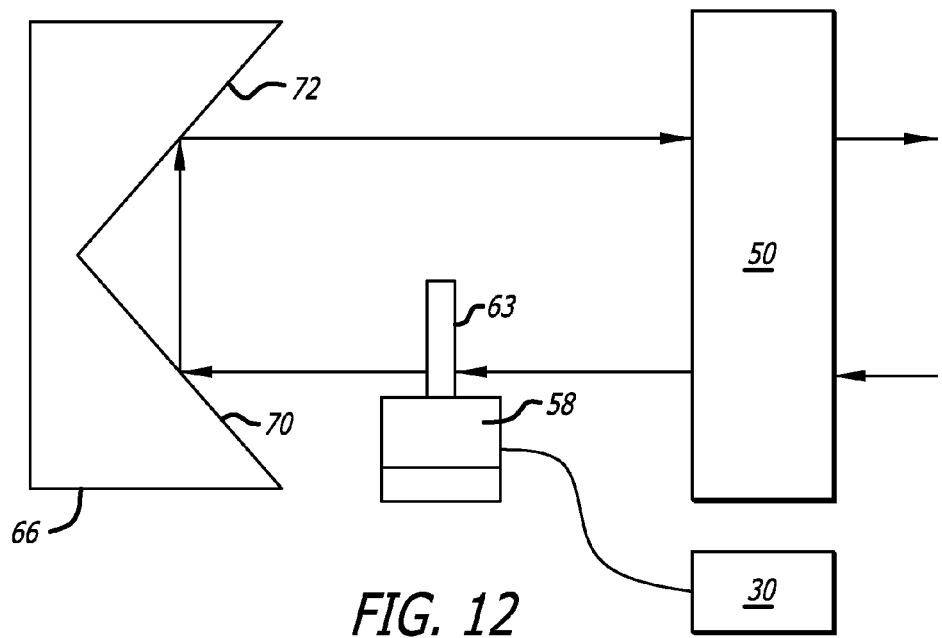
FIG. 12 is an elevation view of an embodiment of a retro-reflective optic.

After passing through the slit 52, the laser beam 16 is vertically translated by the retro-reflector 66 as shown in more detail in FIG. 12. The retro reflector 66 may be configured to vertically offset the height of the laser beam or optical path 16 by about 4 mm to about 20 mm such that the beam or optical path of a beam incident on output coupler 14 passes above reflective mirror 26. The beam incident on the retro-reflector 66 first contacts a lower reflective surface 70 and then propagates to an upper reflective surface 72. The upper reflective surface 72 may be substantially orthogonal to the lower reflective surface 70 for some embodiments. The beam propagates from the upper reflective surface 72 of the retro-reflector 66 back to the prism 50 as shown in FIG. 12. The laser beam is then refracted by prism 50 and propagates to prism 46 where the beam is again refracted by prism 46 and travels substantially parallel to the laser beam below. The laser beam then passes over mirror 26 and propagates to output coupler 14. The beam may also pass through an optional acousto-optical modulator 74 disposed adjacent the output coupler 14 or at any other suitable location within the optical cavity and beam path thereof. The AOM 74 may also be used for mode-locking of the laser beam within the laser cavity. Mode-locking, such as regenerative mode-locking, may be used to enhance the performance of the laser system 10.

The laser system 10 may include a beam pick off optic 76, such as a wedge or the like, that is used to redirect a sample of the lasing beam to one or more detectors. For example, beam pick off 76 may be used to reflect a small percentage of the laser beam to beam position sensor or detector 44. The position detector 44 may be in operative communication with the controller 30. The controller 30 may be configured to process beam position data and produce a beam position correction signal based on the beam position data. The beam position correction signal may then be communicated to the actuator 42 of an optical element such as mirror 26 in order to reposition the mirror 26 to correct the beam position to a desired beam path. The beam pick off 76 may also be used to direct a sample of the laser beam to a mode locking detector 78. The mode locking detector 78 may be in operative communication with the controller 30 in order to provide mode locking data to the controller 30 which may then be processed by the controller 30.

A safety shutter 80 may be disposed at an output of the laser system 10 after the beam pick off optic 76 or at any other suitable location within the optical beam path of the laser system 10. The safety shutter 80 may be closed manually or based on one or more interlock switches (not shown) automatically in order to prevent unwanted emission from the laser system 10 while the system is active. The laser system 10 may also include additional mirrors, such as mirror 40, or other optical components in order to lengthen the laser cavity, position the optical path of the laser system 10 in a desired location or other reasons.

In use, some embodiments include a method of generating short-pulse laser output having a preselected center operating wavelength and preselected bandwidth. The method may include entering a desired preselected center operating wavelength and preselected bandwidth into a user interface 36 of a laser system 10, such as the graphic user interface in operative communication with the controller 30. The preselected center operating wavelength and bandwidth data previously entered into the user interface 36 may then be stored in a storage device 34 of the controller 30 and processed by the processor 32 of the controller 30 of the laser system 10.

The processing by the processor 32 may include correlating the preselected center operating wavelength and bandwidth data entered by the user with corresponding settings for a wavelength tuning system and a bandwidth control system of the laser system 10. The respective settings may be determined by the processor 32 with reference to a lookup table. For some embodiments, the lookup table may have a predetermined set of laser system parameters stored in memory for each set of user input beam characteristics. For example, if a user selects a desired wavelength and bandwidth, the lookup table may include the slit width, slit position and insertion position of prism 46 relative to the beam path necessary to achieve the selected wavelength and bandwidth. The respective settings from the lookup table or the like may then be communicated by the processor 32 to the wavelength tuning system and bandwidth control system. The wavelength tuning system and bandwidth control system may then assume respective configurations corresponding to the respective settings communicated by the controller 30. A gain medium 18 disposed within a laser cavity of a laser system 10 may then be pumped with pump energy 28 in order to generate a laser beam within the laser cavity having a center operating wavelength at the pre-selected center operating wavelength and a bandwidth at the pre-selected bandwidth.

As discussed above, some laser beam positioning method embodiments may also include sensing a position of the laser beam 16 within the laser cavity with a position sensor 44 and communicating laser beam position data to the controller 30 or memory device 34 of the controller 30. The beam position data may then be processed with the processor, generating position correction data with the processor 30 and communicating the position correction data from the processor 30 to a beam position actuator. The beam position actuator may be operatively coupled to an optical element or pointing optic in an optical path within the laser system cavity. As discussed above, the position correction data may be communicated to an actuator 42 configured to reposition the reflective mirror 26 in order to correct the beam path. Such an arrangement may form a feedback loop configured to maintain a desired beam path for the laser beam within the laser cavity.

For some embodiments, a piezoelectric actuator 42 may be operatively coupled to the reflective mirror 26 or other suitable reflective optic of the laser cavity. Beam path correction or adjustment may be carried out by orientation of the reflective mirror or optic 26 to redirect or point the laser beam to a desired beam path. Some method embodiments also include passing the laser beam through at least one coating on a reflective optic of the laser system, the at least one coating configured to control dispersion of the laser beam.

Figure 13:
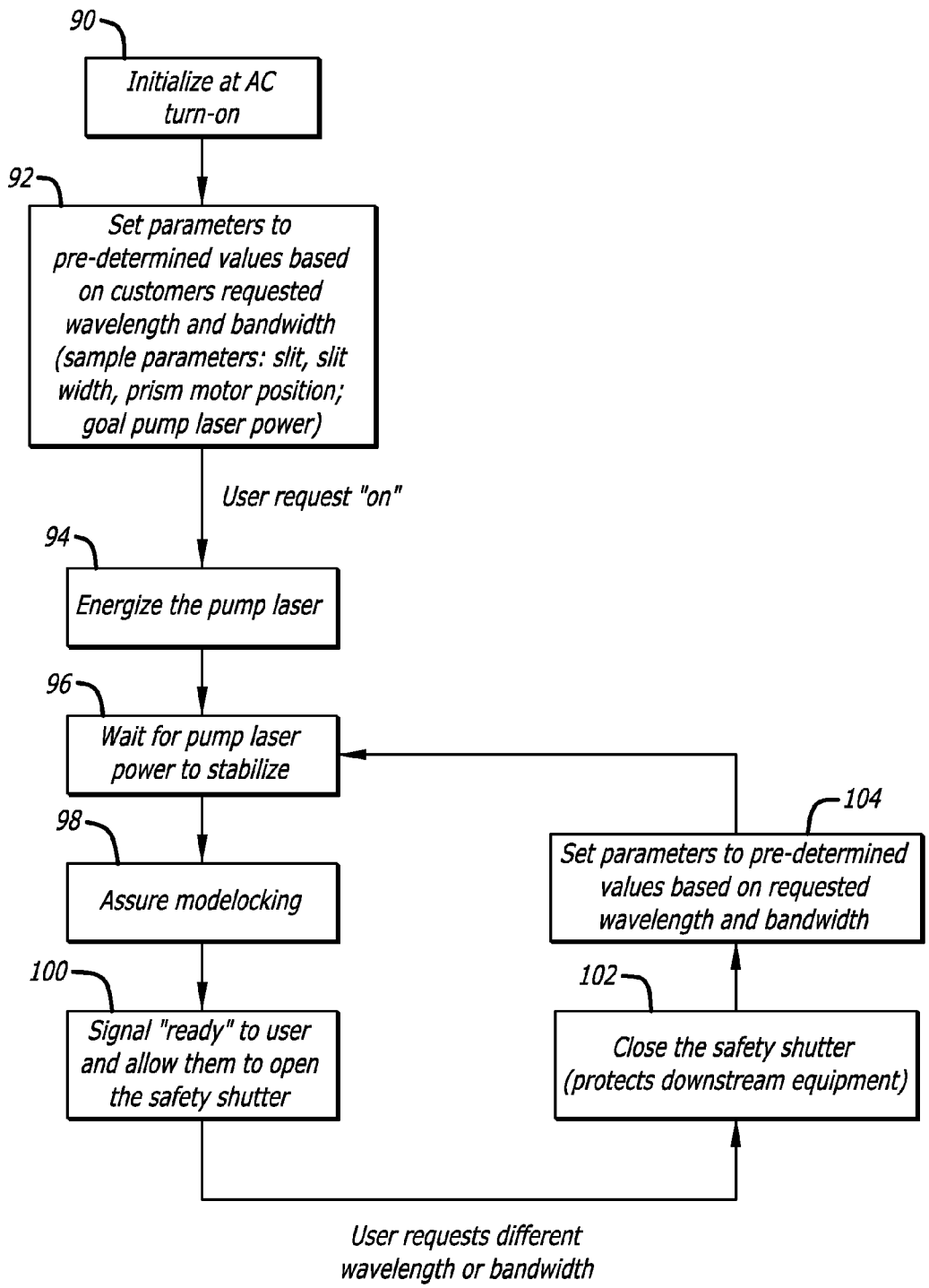
FIG. 13 is a flow diagram of a laser control method embodiment.

FIG. 13 is a flow diagram of a laser tuning algorithm embodiment of the laser system discussed above. As shown in the figure, the laser system 10 may be initialized by turning the system on with an AC power switch as indicated in box 90. The user may then set parameters to desired predetermined values as shown in box 92. The setting of desired laser beam parameters may be carried out by user interaction with the graphic user interface 36 which may be menu driven or have any other suitable interface. Some parameters that may be set include center wavelength, bandwidth, pulse width and peak pulse power. The desired parameters are communicated by the user interface 36 to the controller 30 which may then process the parameters in order to derive settings for the various actuators of the laser system 10 discussed above. The user may then select that the laser be set on or activated. The pump energy source such as a pump laser 24 may then be activated as indicated in box 94 of FIG. 13. Once activated, the pump energy source 24 may be allowed to stabilize as indicated in box 96 prior to allowing the laser beam to exit the cavity or laser housing.

For some embodiments, the laser beam may be blocked during this stabilization phase and during the assurance of modelocking as indicated by box 98. Once the laser beam is stable and modelocked, the safety shutter 80 may be opened and the laser beam emitted from the output coupler 14 and laser housing (not shown) that may be configured to surround the laser system 10 for use as indicated by box 100. This process may be repeated in order for a user to select a different set of operating parameters. In such a case, the user inputs new operating parameters into the laser system 10 via the user interface. The safety shutter 80 may then be closed by the controller 30, see box 102, and the new parameters processed by the controller 30. New settings for the various actuators may then be communicated to the actuators as indicated in box 104 of FIG. 13. The settings may be communicated by electrical signals over conducting wires, optical signals over light conduits such as optical fibers or any other suitable conduit or transmission method. The actuators then assume the position or configuration that corresponds to the settings and the system 10 is once again allowed to stabilize prior to reopening the safety shutter 80.

Figure 14:
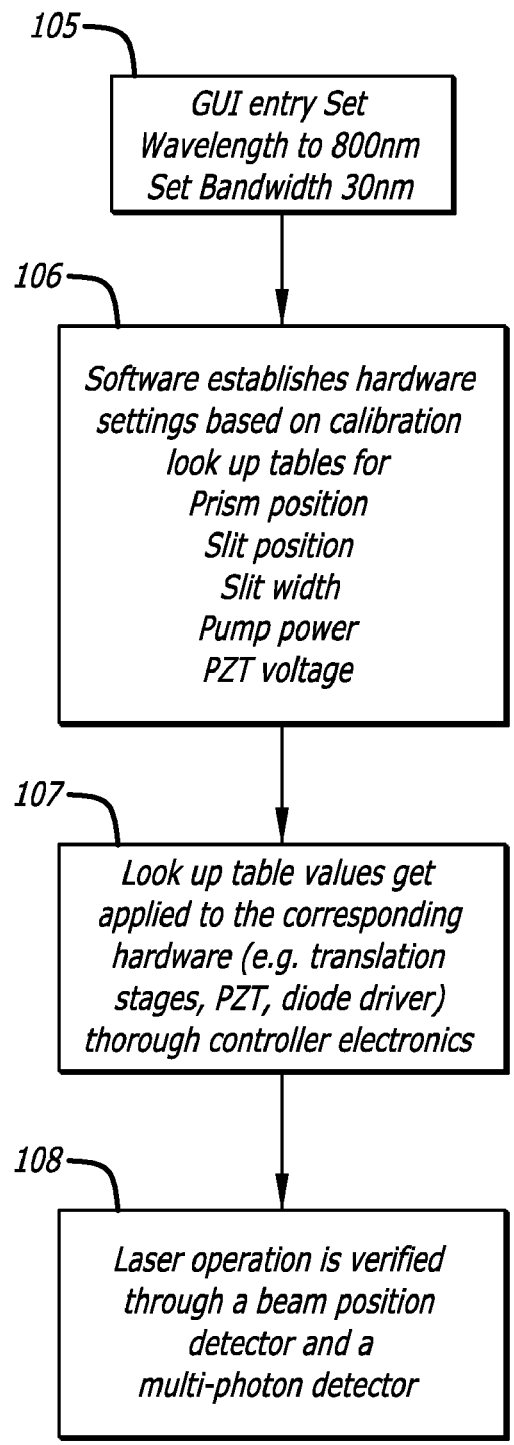
FIG. 14 is a flow diagram of a laser control method embodiment.

FIG. 14 illustrates a more detailed view of the process by which user input of preselected beam parameters are processed into a desired laser cavity and laser element set up. As discussed above with regard to box 92, a user may set predetermined beam parameters such as a wavelength of 800 nm and bandwidth of 30 nm as shown in box 105 of FIG. 14. A software protocol may then establish hardware settings based on calibration lookup tables stored in the memory device or other device of the laser system, as shown in box 106, to determine prism 46 position, slit 52 position, slit 52 width, pump source 24 power level and a piezoelectric transducer voltage level for the piezoelectric actuator 42 to set the position of mirror 26 or the like. Thereafter, the lookup table values are applied to the respective hardware components through controller electronics of the processor and respective actuators as shown in box 107. Finally, laser operation may be verified through the beam position detector 44, multi-photon detector or both. For any of the system elements discussed herein that are in mutual operative communication with each other, such elements may communicate data or energy via signals over conducting wires, optical signals over light conduits such as optical fibers or any other suitable conduit or transmission method.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the invention. Although embodiments of the invention have been described in substantial detail with reference to one or more specific embodiments, changes may be made to the embodiments specifically disclosed in this application, yet these modifications and improvements may be within the scope and spirit of the embodiments of the invention.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to, and such modifications and variations may be considered to be within the scope of invention embodiments.

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. A tunable laser system, comprising:
   a laser cavity defined by an end mirror disposed at a first end of the laser cavity and an output coupler disposed at a second end of the laser cavity;
   a gain medium disposed within the laser cavity including an opposed pair of beam input surfaces;
   a wavelength tuning system configured to tune the laser system to laser at a band centered at a predetermined wavelength set by a user;
   a bandwidth control system configured to maintain the bandwidth of the lasing energy of the system at the predetermined bandwidth set by the user; and
   a controller operatively coupled to the wavelength tuning system and the bandwidth control system and configured to adjust the wavelength tuning system and the bandwidth control system to maintain the respective predetermined center operating wavelength and bandwidth.

2. The laser system of claim 1 wherein the laser cavity comprises a ring cavity including a plurality of mirrors.

3. The laser system of claim 1 further comprising a user interface device configured to allow the user to select the predetermined center operating wavelength and the bandwidth.

4. The laser system of claim 1 further comprising a pump source configured to generate pump energy that passes through the gain medium along the laser beam path within the gain medium.

5. The device of claim 1 wherein the gain medium comprises a Ti:Sapphire crystal.

6. The laser system of claim 1 further comprising a beam location sensor coupled to the controller and a mirror positioning actuator mechanically coupled to a mirror of the laser system and in operative communication the controller wherein the controller is configured to receive beam position data from the beam location sensor and instruct the mirror positioning actuator to adjust the mirror to maintain a desired beam path.

7. The laser system of claim 1 wherein the controller comprises a computer processor.

8. The laser system of claim 3 wherein the user interface device comprises a GUI user interface device.

9. The laser system of claim 1 wherein the wavelength tuning system comprises a prism pair and an adjustable optical slit.

10. The laser system of claim 9 wherein the positions of a first opaque edge of the slit and second opaque edge of the slit are determined by a software program that sets both the position and the spread of the adjustable optical slit to achieve both a desired center operating wavelength and bandwidth.

11. The laser system of claim 1 wherein the bandwidth control system comprises a prism pair with at least one of the prisms coupled to an actuator which is in operative communication with the controller for adjusting the amount of refractive prism material disposed within a beam path.

12. The laser system of claim 1 wherein at least one of the beam input surfaces of the laser gain medium comprises an angled beam input surface which is formed at an angle which is non-perpendicular to a laser beam path within the gain medium.

13. The device of claim 4 wherein the pump source comprises a laser.

14. The device of claim 13 wherein the pump source comprises a diode pumped solid state laser.

15. The laser system of claim 1 wherein the wavelength tuning system comprises a refractive prism disposed in a laser beam path which is configure to transversely position the laser beam path according to wavelength and a narrow translatable slit that is translatable in a direction along the direction of transverse position.

16. The laser system of claim 10 wherein the actuator for translation of the refractive prism comprises a motor.

17. The laser system of claim 1 wherein the wavelength tuning system is tunable over a wavelength range of about 450 nm.

18. The laser system of claim 17 wherein the wavelength tuning system is tunable to a center wavelength of about 650 nm to about 1100 nm.

19. The laser system of claim 1 wherein a pulse width of an output of the laser system is less than about 1 ps [picosecond].

20. The laser system of claim 1 wherein a pulse width of an output of the laser system is about 10 fs to about 100 fs.

21. The laser system of claim 1 wherein the wavelength tuning system is configured to tune the laser output to a wavelength of about 780 nm to about 820 nm.

22. The laser system of claim 1 wherein the bandwidth control system is configured to generate a bandwidth range of about 10 nm to about 120 nm.

23. The laser system of claim 1 wherein the controller configures the bandwidth control system and wavelength tuning system components to achieve predetermined center operating wavelength and bandwidth selected by the user by correlating these selected parameters to previously calibrated configurations stored in a lookup data chart.

24. The laser system of claim 1 further comprising a dispersion control system.

25. The laser system of claim 24 wherein the dispersion control system comprises a dispersion control coating on at least one reflective optic of the laser system.

26. The laser system of claim 25 wherein the reflective mirror and output coupler both comprise the dispersion control coating on a reflective surface thereof.

27. The laser system of claim 26 wherein the dispersion control coating comprises materials selected from the group consisting of silicone oxide and titanium oxide.

28. The laser system of claim 24 wherein the dispersion control system comprises at least one chirped reflective mirror.

29. The laser system of claim 28 wherein the at least one chirped reflective mirror comprises a parabolic curve for chirped coatings.

30. The laser system of claim 29 wherein the parabolic curve of the chirped coating is tailored to a specific laser cavity of the laser system.

31. The laser system of claim 28 wherein the chirped reflective surface of the chirped reflective mirror comprises layers of at least two different materials having different indices of refraction.

32. The laser system of claim 31 wherein the layers of two different materials of the chirped reflective coating have thicknesses of about 1 nm to about 400 nm.

33. The laser system of claim 32 wherein the layers of two different materials of the chirped reflective coating have thicknesses of about 2 nm to about 200 nm.

34. A tunable laser system, comprising:
a laser cavity defined by an end mirror disposed at a first end of the laser cavity and an output coupler disposed at a second end of the laser cavity;
a gain medium disposed within the laser cavity including an opposed pair of beam input surfaces;
a wavelength tuning system configured to tune the laser system to lase at a band centered at the predetermined wavelength set by the user;
a bandwidth control system configured to maintain the bandwidth of the lasing energy of the system at the predetermined bandwidth set by the user; and
a dispersion control system comprising at least one chirped reflective mirror including a parabolic response curve configured to control dispersion within the laser cavity of the laser system.

35. The laser system of claim 34 wherein the laser cavity comprises a ring cavity including a plurality of mirrors.

36. The laser system of claim 34 wherein a chirped reflective surface of the at least one chirped reflective mirror comprises layers of at least two different materials having different indices of refraction.

37. The laser system of claim 36 wherein the layers of two different materials of the chirped reflective coating have thicknesses of about 1 nm to about 400 nm.

38. The laser system of claim 37 wherein the layers of two different materials of the chirped reflective coating have thicknesses of about 2 nm to about 200 nm.

39. The laser system of claim 35 further comprising a user interface device configured to allow a user to select a predetermined center operating wavelength and bandwidth.

40. The laser system of claim 39 further comprising a controller operatively coupled to the user interface device, wavelength tuning system and bandwidth control system actuators and configured to adjust the wavelength tuning system and bandwidth control system to maintain the respective predetermined center operating wavelength and bandwidth.

41. The laser system of claim 34 further comprising a pump source configured to generate pump energy that passes through the gain medium along the laser beam path within the gain medium.

42. A method of generating short-pulse laser output having a preselected center operating wavelength and preselected bandwidth, comprising:
- entering a desired preselected center operating wavelength and bandwidth into a user interface of a laser system;
- processing the preselected center operating wavelength and bandwidth data previously entered into the user interface with a processor and correlating the data with corresponding settings for a wavelength tuning system and a bandwidth control system of the laser system;
- communicating the respective settings from the processor to the wavelength tuning system and bandwidth control system such that the wavelength tuning system and bandwidth control system assume respective configurations corresponding to the respective settings; and
- pumping a gain medium disposed within a laser cavity of a laser system to generate a laser beam within the laser cavity having a center operating wavelength at the pre-selected center operating wavelength and a bandwidth at the pre-selected bandwidth.

43. The method of claim 42 further comprising sensing a position of the laser beam within the laser cavity with a position sensor, communicating the laser beam position to the controller, processing the beam position data with the processor, generating position correction data with the processor and communicating the position correction data from the processor to a beam position actuator operatively coupled to an optical path within the laser system cavity.

44. The method of claim 43 wherein communicating the position correction data from the processor to a beam position actuator operatively coupled to an optical path within the laser system cavity comprises communicating the position correction data from the processor to a piezoelectric actuator operatively coupled to a reflective mirror of the laser cavity and adjusting the orientation of the reflective mirror to redirect the laser beam to a desired beam path.

45. The method of claim 42 further comprising passing the laser beam through at least one coating on a reflective optic of the laser system, the at least one coating configured to control dispersion of the laser beam.

* * * * *

UNITED STATES PATENT AND TRADEMARK OFFICE
CERTIFICATE OF CORRECTION

PATENT NO. : 8,218,587 B2  
APPLICATION NO. : 12/790653  
DATED : July 10, 2012  
INVENTOR(S) : Ventzislav Stoev et al.

Page 1 of 1

It is certified that error appears in the above-identified patent and that said Letters Patent is hereby corrected as shown below:

IN THE CLAIMS:

Column 16
    Claim 1, line 43 should read:
        "system to lase at a band centered at a predetermined".

Column 17
    Claim 15, line 35 should read:
        "beam path which is configured to tranversely position the".

Signed and Sealed this
Eighth Day of September, 2015

Michelle K. Lee
*Director of the United States Patent and Trademark Office*